United States Patent
Vassilieff et al.

(10) Patent No.: US 9,895,942 B2
(45) Date of Patent: Feb. 20, 2018

(54) METHOD FOR THE HANDS-FREE ACCESS TO A MOTOR VEHICLE AND FOR MONITORING THE PRESSURE OF THE TIRES MOUNTED ON SAID MOTOR VEHICLE

(71) Applicants: Youri Vassilieff, Toulouse (FR); Helene Garnier, Pins Justaret (FR)

(72) Inventors: Youri Vassilieff, Toulouse (FR); Helene Garnier, Pins Justaret (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/366,804

(22) PCT Filed: Dec. 17, 2012

(86) PCT No.: PCT/EP2012/005212
§ 371 (c)(1),
(2) Date: Jun. 19, 2014

(87) PCT Pub. No.: WO2013/091823
PCT Pub. Date: Jun. 27, 2013

(65) Prior Publication Data
US 2014/0368326 A1 Dec. 18, 2014

(30) Foreign Application Priority Data
Dec. 23, 2011 (FR) .................. 11 04049

(51) Int. Cl.
*H03D 5/00* (2006.01)
*B60C 23/04* (2006.01)
(Continued)

(52) U.S. Cl.
CPC ...... *B60C 23/0433* (2013.01); *B60C 23/0418* (2013.01); *B60R 25/24* (2013.01);
(Continued)

(58) Field of Classification Search
CPC ............ B60C 23/0433; B60C 23/0408; B60C 23/0418; B60C 23/0435
(Continued)

(56) References Cited

U.S. PATENT DOCUMENTS 5,463,374 A * 10/1995 Mendez .............. B60C 23/0433
340/442
6,359,556 B1 * 3/2002 Katou ................. B60C 23/0408
340/447
(Continued)

FOREIGN PATENT DOCUMENTS

EP 1 428 694 6/2004
FR 2 884 322 10/2006

OTHER PUBLICATIONS

International Search Report dated Mar. 12, 2013 in corresponding PCT application.

*Primary Examiner* — Brent Swarthout
(74) *Attorney, Agent, or Firm* — Young & Thompson

(57) ABSTRACT

A method for the hands-free access to a motor vehicle (V) is combined with a method for monitoring tire pressure. More particularly, wheel units (20, 21, 22, 23) belonging to the tire pressure recognition system detect the cessation of low frequency LF transmissions caused by the recognition of a badge B paired with the vehicle in order to trigger the measurement via the wheel units of the pressure and temperature values prevailing in each tire of the vehicle. These pressure and temperature measurements are sent to a central unit (14), which is mounted on the vehicle, so as to provide the driver with this information. The temperature and pressure measurements are transmitted to the central unit as soon as the measurements have been taken, irrespective of whether or not the driver has entered the vehicle.

10 Claims, 2 Drawing Sheets

Figure 1:
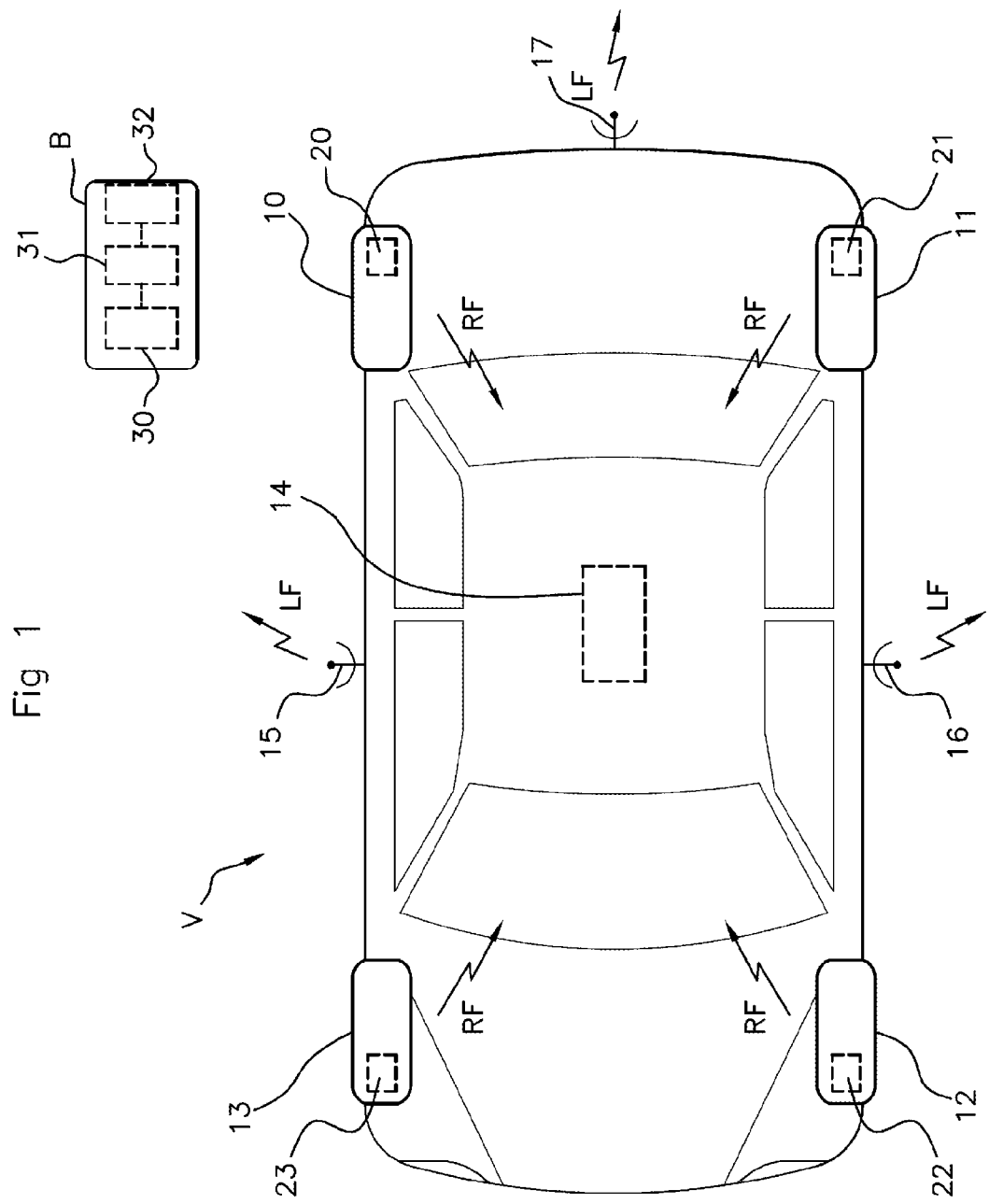

(51) Int. Cl.
*G07C 9/00* (2006.01)
*B60R 25/24* (2013.01)

(52) U.S. Cl.
CPC ............... *G07C 9/00309* (2013.01); *G07C 2009/00333* (2013.01); *G07C 2009/00793* (2013.01)

(58) Field of Classification Search
USPC ........................................ 340/5.61, 442, 447
See application file for complete search history.

(56) References Cited

U.S. PATENT DOCUMENTS

| | | | | |
|---|---|---|---|---|
| 6,965,296 B2 * | 11/2005 | Kamlah | ............... | B60R 25/00 340/10.41 |
| 7,647,031 B2 * | 1/2010 | Okumura | ............... | B60C 23/0408 340/426.13 |
| 8,335,598 B2 * | 12/2012 | Dickerhoof | ............... | 340/438 |
| 2004/0113765 A1 * | 6/2004 | Suitsu | ............... | B60C 23/0408 340/445 |
| 2004/0123654 A1 * | 7/2004 | Komatsu | ............... | B60C 23/0408 73/146 |
| 2005/0093686 A1 * | 5/2005 | LeMense | ............... | B60C 23/0433 340/442 |
| 2006/0087423 A1 * | 4/2006 | Coronel | ............... | G01D 21/00 340/539.1 |
| 2007/0021082 A1 * | 1/2007 | Okumura | ............... | B60C 23/0408 455/142 |
| 2007/0200676 A1 * | 8/2007 | Costes | ............... | B60C 23/0408 340/10.1 |
| 2011/0084826 A1 * | 4/2011 | Lin | ............... | B60C 23/0408 340/447 |
| 2011/0254660 A1 * | 10/2011 | Sun | ............... | B60C 23/0418 340/5.61 |
| 2012/0060598 A1 * | 3/2012 | Kessler | ............... | B60C 23/0416 73/146.5 |

* cited by examiner

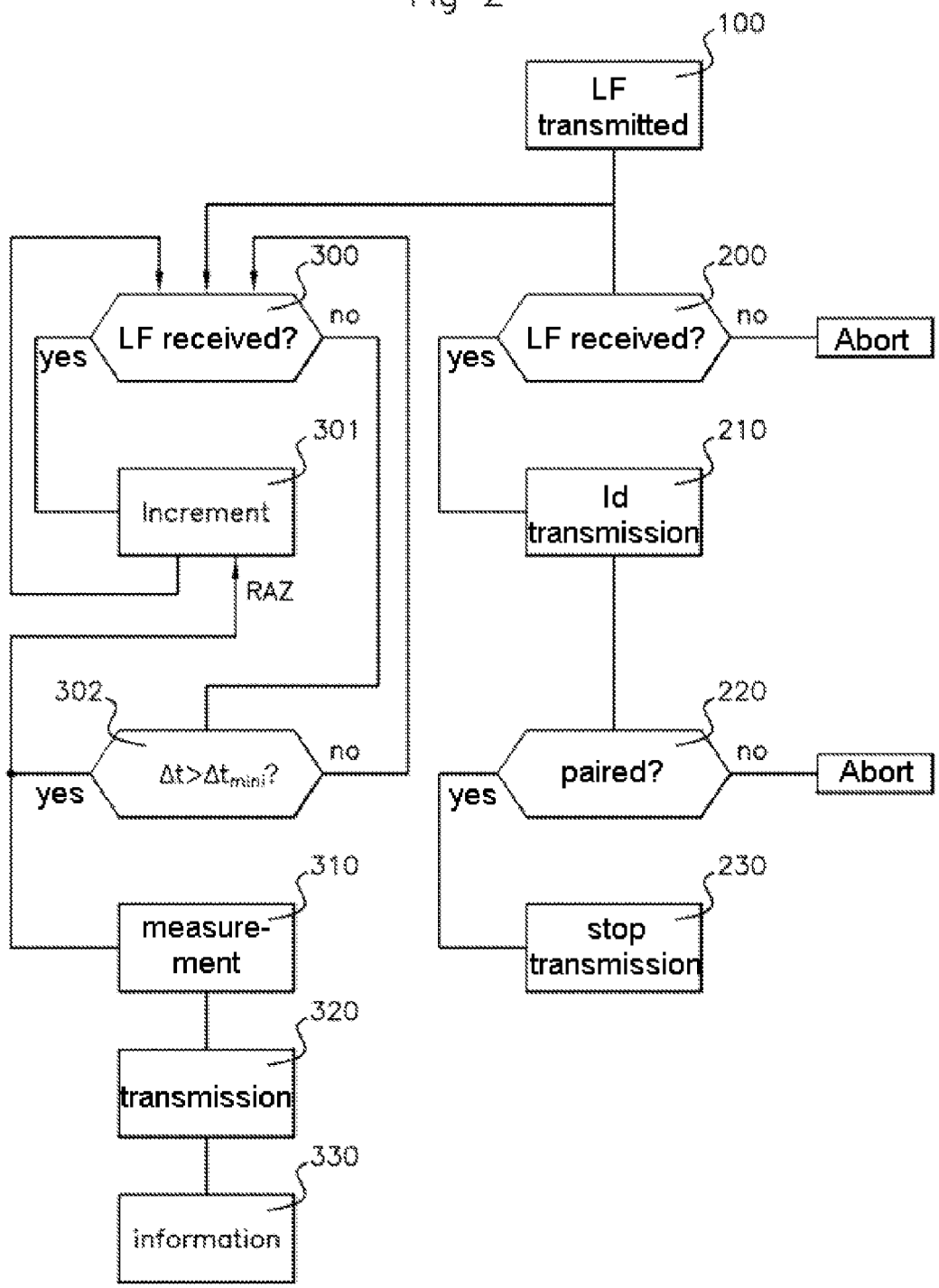

METHOD FOR THE HANDS-FREE ACCESS TO A MOTOR VEHICLE AND FOR MONITORING THE PRESSURE OF THE TIRES MOUNTED ON SAID MOTOR VEHICLE

The present invention relates to a method for the hands-free access to a motor vehicle, said method being combined with a method for monitoring tire pressure. More particularly, the method involves indicating as quickly as possible to a driver entering a vehicle the state of inflation of the tires mounted on said vehicle.

Methods and systems for the hands-free access to a vehicle are already known. These methods and systems allow an individual carrying a badge (also referred to as a portable identifying element) to access a vehicle without having to unlock the access points thereof by means of a voluntary mechanical action. Of course, this automatic unlocking of the access points of the vehicle when a badge carrier approaches is only performed once it has been verified that the badge in question and the vehicle are paired. This verification of the pairing between a badge and a motor vehicle is performed by exchange of low frequency (LF) signals originating from a central unit installed in the vehicle and radio frequency (RF) response signals transmitted by the badge. Such hands-free access methods and systems are well known per se and will not be detailed here.

Systems and methods for monitoring the pressure of the tires installed on a vehicle are also already known. Systems and methods of this type in particular comprise a central unit mounted on the motor vehicle, said central unit communicating with wheel units mounted on each of the wheels of the motor vehicle. Each wheel unit is adapted to measure at least the pressure and the temperature prevailing within a tire. The pressure and temperature values thus measured are then transmitted to the central unit mounted on the vehicle. When the value of one of the measured parameters is abnormal, an alarm (visual, audible, etc.) is transmitted to the driver of the vehicle. Information is exchanged by low frequency (LF) signals between the vehicle and the wheel units and by radio frequency (RF) signals between the wheel units and the vehicle. Tire pressure monitoring methods and systems of this type are well known per se and will not be detailed here.

It is also already known to combine the tire pressure monitoring systems and hands-free access systems so as to use common microcontrollers (central unit) and/or common antennas.

One of the problems that these combinations of tire pressure monitoring systems and systems providing hands-free access to a motor vehicle seek to solve is the speed with which any anomalies in tire pressure are transmitted to the driver of a motor vehicle. Of course, it is sought in particular to provide the information concerning the pressure anomaly as soon as the driver enters his vehicle.

Document EP 1 428 694 suggests establishing bidirectional communication between the vehicle, the access badge and the tire pressure monitoring system. To this end, this document describes a method making it possible to trigger a measurement of the tire pressures as soon as a driver starts his vehicle, that is to say as soon as the engine of the vehicle is operational. To this end, the low frequency signals transmitted by the vehicle comprise two separate request signals: a first request is destined for the hands-free access system and a second request is destined for the tire pressure monitoring system. However, this solution requires modification of the format of the signals transmitted by the vehicle. The tire pressure monitoring systems and the hands-free access systems are also modified so as to use in particular shared microcontrollers and/or antennas. In addition, the driver is informed of a pressure anomaly only if the engine of his vehicle is operational, and not as soon as he enters the vehicle.

The object of the present invention is to inform the driver of a vehicle of any pressure anomaly of the tires mounted on his vehicle before he even starts up the engine of the vehicle, without modifying the format of the (LF) signals transmitted by the vehicle and without modifying the existing tire pressure monitoring systems and hands-free access systems. The object of the present invention is therefore to inform the driver of any pressure anomalies as quickly as possible whilst using the conventional tire pressure monitoring systems and hands-free access systems.

To this end, the present invention proposes a method for hands-free access and for monitoring the pressure of the tires of a motor vehicle, comprising the following steps transmitting low frequency signals by means of door antennas associated with the hands-free access system of the vehicle, receiving the transmitted low frequency signals by means of a portable element associated with the hands-free access system and by means of wheel units mounted on each of the wheels of the vehicle and associated with the tire pressure monitoring system, transmitting via the portable element a response message to the vehicle, said message comprising at least one identifying code enabling a central unit forming part of the hands-free access system to verify whether the portable element is paired with the vehicle, and, if so, ceasing the transmissions of low frequency signals of the hands-free access system of the vehicle.

Said method is characterized in that it also comprises the following steps:

detecting via the low frequency receiving antennas of the wheel units of the tire pressure monitoring system the cessation of the transmission of low frequency signals by the vehicle access system, and measuring and transmitting via the tire pressure monitoring system the pressure and temperature values prevailing within each tire, the values being transmitted in the direction of a tire pressure monitoring central unit mounted in the vehicle.

The present invention thus consists of detecting the fact that a portable element has been authenticated by the system for hands-free access to the vehicle so as to automatically trigger the tire pressure monitoring method. The authentication of a portable element is detected simply by the detection of the cessation of the low frequency (LF) scanning, also referred to as the cessation of the "LF polling", which results from the authentication of the portable element as an element paired with the vehicle. Thus, the present invention lies in recognizing that the cessation of the transmission of low frequency signals by the system for hands-free access to the vehicle is detectable by the wheel units of the tire pressure monitoring system.

In fact, although the format of the information transmitted by low frequency LF signals of the tire pressure monitoring system and of the hands-free access systems may be different, each of the systems can detect the transmission and the cessation of the transmission of these signals without decoding the content thereof.

The tire pressure monitoring system and more particularly the wheel units mounted on each of the wheels thus detect the transmission and the cessation of transmissions of low frequency signals transmitted by the vehicle for the hands-free access system, without decoding the content of said signals. This allows the tire pressure monitoring system to detect the fact that a badge belonging to the vehicle has been detected and authenticated by the vehicle. In accordance with the invention, the tire pressure monitoring system then automatically triggers a measurement of the tire pressures so as to be able to provide the driver with this information as soon as he enters the vehicle.

If, by chance, the cessation of the low frequency LF signals was not linked with the recognition of a badge paired with the vehicle, but was the result of an error of the system or any other incident, this would have no effect however with regard to the security of the vehicle. By contrast, this reflects the fact that the tire pressure sensor has entered a zone not covered by the LF transmissions of the door antennas. This may actually be caused by a failure, but more frequently by a parasite (for example the motor of a fan of an underground parking area) or even merely by an obstruction that deflects the field lines (for example the metal mass of a truck in the vicinity). It is therefore beneficial to transmit the pressure information at this moment, because there is a good chance that the situation will not change with the restart of the vehicle and that the LF frames will no longer be able to pass at this moment and reach the sensor. It would even be advisable to start periodic RF transmissions in this case. Only the consumption of the batteries contained in the wheel units could potentially be affected; however, since these cases of cessation of LF transmissions are very rare, the impact on the service life of the batteries is negligible.

The present invention advantageously makes it possible to provide information quickly to the driver, without modifications of the formats of LF transmissions and without starting the engine of the vehicle.

As a result, the tire pressure monitoring system is activated as soon as a portable element of a vehicle access system has been authenticated. This authentication is performed before any action on the vehicle by the person carrying the portable element (for example before a door of the vehicle is opened). Of course, this authentication of the portable element is also performed before the engine of the vehicle is started. As a result, the tire pressure monitoring procedure is implemented and terminated much more quickly than in the prior art. Any pressure anomaly detected on one of the tires of the vehicle can thus be indicated very quickly to the driver long before the engine is started. In fact, the temperature and pressure measurements are transmitted to the central unit as soon as the measurements are taken, whether or not the driver has entered the vehicle. This transmission is in fact performed as soon as a badge paired with the vehicle is detected in a zone close to the vehicle.

The information of the tire pressure measurement is transmitted by RF signals to the body control module, which remains always powered. An RF receiver continuously searches the surrounding environment, for example listening for RF transmissions from the badge, but also RF frames of the tire pressure sensors. This information will be dated and stored by the body control module (BCM) so as to be displayed on the dashboard immediately after ignition.

It is also noted that, in accordance with the present invention, the format of the low frequency signals transmitted by the hands-free access system remains unchanged. There is no need for any modification of the microcontrollers and/or the antennas of the tire pressure monitoring systems or hands-free access system.

Advantageously, only the pressure and/or temperature anomalies detected by the tire pressure monitoring system are indicated to the driver. In a variant, the pressure and/or temperature measurements are transmitted to the driver irrespective of whether or not there are anomalies.

The cessation of the low frequency LF transmissions by the hands-free access system is advantageously detected when the wheel units of the tire pressure monitoring system no longer receive low frequency signals during a determined period of time following a time interval during which regular transmissions of low frequency signals have been detected.

The step of transmission of measured pressure and temperature values in the direction of a tire pressure monitoring central unit mounted in the vehicle, in order to provide the driver with this information, advantageously comprises periodic transmissions of measured values until a new detection, by means of the LF receiving antennas of the wheel units of the tire pressure monitoring system, of a transmission of LF signals by the hands-free access system.

Further objectives, advantages and features of the present invention will emerge from the following detailed description provided by way of non-limiting example with reference to the accompanying drawing, in which:

FIG. 1 is a schematic view illustrating the different elements of the hands-free access and tire pressure monitoring device according to the invention, and FIG. 2 is a flow chart illustrating the method according to the invention.

In accordance with the embodiment illustrated in FIGS. 1 and 2, a vehicle V is equipped with four wheels 10, 11, 12 and 13 each fitted with a tire (not illustrated). A wheel unit 20, 21, 22 and 23 is mounted in each of these tires. Said wheel unit is equipped with suitable sensors (known per se) for measuring at least the pressure and temperature prevailing within the tires. The vehicle V is also equipped with a central unit 14 (microcontroller) communicating with the wheel units via low frequency (LF) signals.

The tire pressure monitoring system is thus formed by the wheel units 20 to 23 mounted on the wheels of the vehicle and by the central unit 14 mounted on the vehicle.

The wheel units communicate to the central unit 14 via radio frequency (RF) signals the temperature and pressure measurements taken. These signals usually have a frequency of 433 MHz. These wheel units are equipped with means for receiving low frequency signals transmitted by the central unit 14.

The vehicle V is also equipped with antennas 15, 16 and 17 placed in the doors of the vehicle and on the luggage compartment. The number of antennas and the placement thereof on the vehicle may be different from that illustrated, without departing from the scope of the present invention.

These antennas are called upon to transmit low frequency signals (of approximately 125 KHz) to a portable badge B. This badge B, also referred to as a portable identifying element or RF key, is carried by the driver of the vehicle (or a passenger). As is known per se, the badge B is equipped with means 30 for receiving the low frequency signals transmitted by the doors of the vehicle. This badge also comprises a microcontroller 31 adapted in particular to decode the received signals and to respond to these low frequency signals via a radio frequency signal RF comprising in particular its identifier, with the aid of an RF transmitter 32. The radio frequency signals RF transmitted via the badge are received by the central unit 14 mounted in the vehicle. In the illustrated example, the central unit receiving the signals originating from the badge is the same as that which receives the RF signals originating from the wheel units. However, this is not mandatory. The vehicle can be equipped with two separate central units.

Once the RF signals originating from a portable badge B have been received by the central unit 14 of the vehicle, the central unit decodes the signals and verifies whether the badge B is paired with the vehicle. If this is the case, the central unit orders the cessation of the transmission of the low frequency LF signals via the antennas 15, 16, 17 arranged on the doors and the luggage compartment of the vehicle, since the pairing between the badge B approaching the vehicle V and the vehicle is now verified. When the vehicle then detects that the driver (or the passenger) operates a door of the vehicle so as to enter the vehicle, it authorizes the opening of this door.

The hands-free vehicle access system is formed by the door and luggage compartment antennas 15, 16, 17 mounted on the vehicle, the portable badge B and the central unit 14.

The present invention combines the tire pressure monitoring systems and the hands-free vehicle access systems with a view to providing the driver as quickly as possible with information concerning the state of inflation of the tires when said driver approaches or enters his vehicle. In particular, the object of the invention is to trigger a measurement of the tire pressures and a transmission of the measured values to the central unit 14 of the vehicle as soon as the driver (or the passenger) enters the vehicle before the engine is started. In fact, a tire inflation anomaly should be known before movement of the vehicle so as to be able to remedy this anomaly while the vehicle is not travelling in road traffic.

To this end, the present invention proposes a method for the hands-free access to a motor vehicle and for monitoring the pressure of the tires mounted on a vehicle, comprising the following steps (FIG. 2):

- transmitting low frequency signals (step 100) by means of antennas 15, 16, 17 associated with the hands-free access system of the vehicle,
- receiving the transmitted low frequency signals by means of a portable element B associated with the hands-free access system (step 200) and by means of the wheel units (step 300) mounted on each of the wheels vehicle and associated with the tire pressure monitoring system,
- transmitting via the portable element B a response message to the vehicle (step 210), said message comprising at least one identifying code Id enabling a central unit (14) forming part of the hands-free access system to verify (step 220) whether the portable element (B) is paired with the vehicle, and, if so,
- ceasing (step 230) the transmissions of low frequency signals of the hands-free vehicle access system.

The method according to the invention also comprises the following steps:

- detecting (step 300) via the LF receiving antennas of the wheel units of the tire pressure monitoring system the cessation of the transmission of low frequency signals by the vehicle access system, and
- measuring (step 310) via the tire pressure monitoring system the pressure and/or temperature values prevailing within each tire,
- transmitting (step 320) in the direction of a tire pressure monitoring central unit (14) mounted in the vehicle the measured pressure and temperature values in order to provide the driver with this information (step 330).

As can be seen in FIG. 2, as long as the wheel units detect the LF signals transmitted via the hands-free access system, a time counter is incremented (step 301) and measures the time ΔT during which regular LF transmissions have been perceived. As soon as the wheel units no longer detect the low frequency LF signals transmitted by the hands-free access system, it is determined whether the received LF signal counter is greater than zero (step 302). If this counter is equal to zero, that is to say if no LF signal has been detected by the vehicle, the method then returns to the step of waiting for LF signals (step 300). If, by contrast, the time counter of received LF signals is greater than zero, and that since a minimum predetermined time interval $\Delta T_{mini}$, the wheel units trigger at least one measurement of the pressure prevailing within the tire (step 310). In general, the temperature prevailing within the tire is also measured. At the same moment, the received LF signals time counter is reset to zero (RAZ). The measured temperature and pressure are transmitted (step 320) to the central unit 14.

It is noted that the central unit 14 is aware of all the pressure measurements. It is therefore possible for the central unit to display all the measured values and to thus provide the driver with the information concerning the last measurements taken, or to inform the driver only of the measured pressure anomalies. However, the supply of this information (step 330) to the driver with regard to the pressure measurements taken is not dependent on the entry of the driver into the vehicle nor on the starting of the vehicle engine. This information is only dependent on the cessation of the low frequency LF transmissions via the door antennas of the hands-free vehicle access system, that is to say on the detection of a badge paired with the vehicle in the immediate vicinity thereof. As a result, the information concerning tire pressures is transmitted to the central unit 14 at the earliest opportunity, and in any case well before the starting of the engine.

It is also noted that the tire pressure monitoring and hands-free vehicle access systems do not require any modification with respect to the conventional known system, except for the insertion of a time counter in the wheel units. These counters utilize those already present in the microcontrollers of each wheel unit.

It is also noted that the measurement of the tire pressures and/or the temperature prevailing within the tires triggered by the cessation of the transmission of low frequency signals via the vehicle access system may be a regular periodic transmission. This transmission of measured temperature and/or pressure values can be performed as long as no new low frequency signals are transmitted by the vehicle access system.

The present invention is not limited to the described and illustrated embodiment.

The invention claimed is:

1. A method for hands-free access to a motor vehicle and for monitoring pressure of tires mounted on said vehicle, comprising the following steps:

- transmitting low frequency signals by antennas associated with a hands-free access system of the vehicle,
- receiving the transmitted low frequency signals by a portable element associated with the hands-free access system and by wheel units mounted on each of the wheels of the vehicle and associated with a tire pressure monitoring system,
- transmitting from the portable element a response message to the vehicle, said message comprising at least one identifying code enabling a central unit forming part of the hands-free access system to verify whether the portable element is paired with the vehicle, and, if so,
- ceasing the transmissions of the low frequency signals by the antennas associated with the hands-free vehicle access system, detecting via low frequency receiving antennas of the wheel units of the tire pressure monitoring system the cessation of the transmission of the low frequency signals, and upon detection of the cessation of the transmission of the low frequency signals and independent of an ignition status for an engine of the vehicle, automatically measuring via the tire pressure monitoring system the pressure and/or temperature values prevailing within each tire, and transmitting in a direction of a tire pressure monitoring central unit mounted in the vehicle the measured pressure and/or temperature values in order to provide a driver with this information.

2. The method as claimed in claim 1, wherein the driver is only informed of measured pressure and/or temperature anomalies.

3. The method as claimed in claim 1, wherein the driver is informed of all the tire pressure measurements taken on the vehicle, irrespective of whether or not these present an anomaly.

4. The method as claimed in claim 1, wherein the cessation of the low frequency signals of the hands-free vehicle access system is detected when no low frequency transmission has been received by the wheel units of the tire pressure monitoring systems during a determined time interval $\Delta t$ greater than a predetermined minimum time interval $\Delta t_{mini}$ during which the low frequency signals have been transmitted regularly.

5. The method according to claim 1, wherein the step of transmission of the measured pressure and temperature values in the direction of the tire pressure monitoring central unit mounted in the vehicle, in order to provide the driver with this information, is constituted by periodic transmissions of measured values until a new detection, by means of the low frequency receiving antennas of the wheel units of the tire pressure monitoring system, of a transmission of the low frequency signals by the hands-free access system.

6. The method as claimed in claim 2, wherein the cessation of transmission of the low frequency signals of the hands-free vehicle access system is detected when no low frequency transmission has been received by the wheel units of the tire pressure monitoring systems during a determined time interval $\Delta t$ greater than a predetermined minimum time interval $\Delta t_{mini}$ during which the low frequency signals have been transmitted regularly.

7. The method as claimed in claim 3, wherein the cessation of transmission of the low frequency signals of the hands-free vehicle access system is detected when no low frequency transmission has been received by the wheel units of the tire pressure monitoring systems during a determined time interval $\Delta t$ greater than a predetermined minimum time interval $\Delta t_{mini}$ during which the low frequency signals have been transmitted regularly.

8. The method according to claim 2, wherein the step of transmission of the measured pressure and temperature values in the direction of the tire pressure monitoring central unit mounted in the vehicle, in order to provide the driver with this information, is constituted by periodic transmissions of measured values until a new detection, by means of the low frequency receiving antennas of the wheel units of the tire pressure monitoring system, of a transmission of the low frequency signals by the hands-free access system.

9. The method according to claim 3, wherein the step of transmission of measured pressure and temperature values in the direction of the tire pressure monitoring central unit mounted in the vehicle, in order to provide the driver with this information, is constituted by periodic transmissions of measured values until a new detection, by means of the low frequency receiving antennas of the wheel units of the tire pressure monitoring system, of a transmission of the low frequency signals by the hands-free access system.

10. The method according to claim 4, wherein the step of transmission of measured pressure and temperature values in the direction of the tire pressure monitoring central unit mounted in the vehicle, in order to provide the driver with this information, is constituted by periodic transmissions of measured values until a new detection, by means of the low frequency receiving antennas of the wheel units of the tire pressure monitoring system, of a transmission of the low frequency signals by the hands-free access system.

* * * * *